US006449609B1

(12) United States Patent
Witkowski (10) Patent No.: US 6,449,609 B1
(45) Date of Patent: ***Sep. 10, 2002

(54) USING MATERIALIZED VIEW TO PROCESS A RELATED QUERY CONTAINING A ONE TO MANY LOSSLESS JOIN

(75) Inventor: Andrew Witkowski, Foster City, CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/221,647

(22) Filed: Dec. 28, 1998

(51) Int. Cl.[7] .............................................. G06F 17/00
(52) U.S. Cl. ............................. 707/4; 707/3; 717/140
(58) Field of Search ................... 707/1–206; 711/1–6, 711/200–203; 709/1, 100; 717/1–11, 140–148

(56) References Cited

U.S. PATENT DOCUMENTS

| | | | | |
|---|---|---|---|---|
| 5,584,024 | A | | 12/1996 | Schwartz ........................ 707/4 |
| 5,812,840 | A | | 9/1998 | Schwartz ........................ 707/4 |
| 5,897,632 | A | | 4/1999 | Dar et al. ........................ 707/2 |
| 5,950,210 | A | * | 9/1999 | Nelson ........................ 707/203 |
| 5,956,706 | A | * | 9/1999 | Carey et al. ..................... 707/2 |
| 5,970,482 | A | | 10/1999 | Pham et al. .................... 706/16 |
| 5,974,407 | A | | 10/1999 | Sacks ............................. 707/2 |
| 5,987,455 | A | * | 11/1999 | Cochrane et al. ............... 707/4 |
| 5,991,754 | A | | 11/1999 | Raitto et al. .................... 707/2 |
| 6,125,360 | A | | 9/2000 | Witkowski et al. ............. 707/2 |
| 6,134,543 | A | | 10/2000 | Witkowski et al. ............. 707/2 |
| 6,199,063 | B1 | | 3/2001 | Colby et al. .................... 707/4 |

OTHER PUBLICATIONS

Bhargava, Gautam et al., "Hypergraph based reorderings of outer join queries with complex predicates", Proceedings of the 1995 ACM SIGMOND International Conference on Management of Data and Symposium on Principles of Database Systems, May 22–25, 1995, AC.

Bhagrava, Gautam et al., "Efficient processing of outer joins and aggregate junctions", Proceedings of the Twelfth International Conference Data Engineering, 1996., Feb. 26–Mar. 1, 1996, pp. 441–449.

Biggs, Maggie, "Oracle8 still in pole position", InfoWorld, Framingham; Dec. 15, 1997, vol. 19, Issue 50, pp. 1, 97, ISSN: 01996649.

Chen, Arbee, "Outerjoin Optimization in Multidatabase Systems", Proceedings of the Second International Symposium on Databases in Parallel and Distributed Systems, 1990, Jul. 2–4, 1990, pp. 211–218.

Pang, HweeHwa et al., "Partially Preemptble Hash Joins", Proceedings of the 1993, ACM SIGMOND international conference on Mangement of data, 1993, pp. 59–68.

Ross, Kenneth et al., "Materialized view maintenance and integrity constraint checking: trading space for time", Proceedings of the 1996 ACM SIGMOND international conference on Management of data, Jun. 3–6, pp. 447–458.

O'Neil et al., "Multi–Table Joins Through Bitmapped Join Indices", SIGMOND Record, vol. 24, No. 3, Sep. 1995, pp. 8–11.

Yan, Weipeng et al., "Performing Group–By before Join", Proceedings of the 10th International Conference on Data Engineering, 1994, Feb. 14–18, 1994, pp. 89–100.

(List continued on next page.)

*Primary Examiner*—David Jung
(74) *Attorney, Agent, or Firm*—Hickman Palermo Truong & Becker LLP; Marcel K. Bingham (57) ABSTRACT

A method and apparatus for transforming queries is described. According to an aspect of the present invention, a select-project-join query Q that specifies at least one semijoin is rewritten into another query that references the materialized view M. A common section shared by the select-project-join query and the materialized view includes the tables being semijoined.

24 Claims, 9 Drawing Sheets

OTHER PUBLICATIONS

Lee, Byung Suk et al., "Outer joins and filters for instantiating objects from relational databases through views", IEEE Transactions on Knowledge and Data Engineering, Feb. 1994, vol. 6, Issue 1, pp. 108–119.

Log, Ming–Ling et al., "Spatial Hash–Joins", Proceedings of the 1996 ACM SIGMOND International Conference on Management of Data, 1996, pp. 247–258.

Marek, Robert et al., "TID Hash Joins", Proceedings of the third international conference in Information and knowledge management, 1994, No 2–, Dec 2, 1994, pp. 42–49.

Mishra, Priti et al., "Join Processing in Relational Databases", ACM Computing Surveys, vol. 24, No. 1, Mar. 1992, pp. 63–113.

Chaudhuri, Surajit et al., "Optimizing Queries with Materialized Views", Proceedings of the Eleventh International Conference on Data Engineering, Mar. 6–10, 1995, pp. 190–200.

Gopalkrishnan, Vivekanand et al., "Issues of Object–Relational View Design in Data Warehousing Environment", 1998 IEEE International Conference on Systems, Man, and Cybernetics, Oct. 11–14, 1998, vol. 3, pp. 2732–2737.

Kuno, Harumi et al., "Augmented Inherited Multi–Index Structure for Maintenance of Materialized Path Query Views", Proceedings of the Sixth International Conference on Research Issues in Data Engineering, Feb. 26–27, 1996, pp. 128–137.

Segev, Arie et al., "Maintaining Materialized Views in Distributed Databases", Proceedings of the Fifth International Conference on Data Engineering, Feb. 6–10, 1989, pp. 262–270.

Liu et al., "Derivation of incremental for nested relations", Database Conference, 2001, ADC 2001, Proceedings, 12th Australasian, Jan. 2001, pp. 76–82.*

Moro et al., "Incremental maintenance of multi–source views", Database Conference, 2001, ADC 2001, Proceedings, 12th Australasian, Jan. 2001, pp. 13–20.*

Ling et al., "A model for evaluating materialized view maintenance algorithms", Web Information Systems Engineering, 2000, Proceedings of the First International Conference on, vol. 1, Jun. 2000, pp. 374–382.*

Bello et al., "Materialized Views in Oracle", VLDB '98, Proceedings of 24th International Conference on Very Large Data Bases, Aug. 24–27, Aug. 1998, New York City, New York, USA.* http://www.research.att.com/conf/vldb98/program.html, Mar. 2001.* http://www.research.att.com/conf/vldb98, Mar. 2001.*

* cited by examiner

Table L — 320

| l.row | l.a | l.b |
|---|---|---|
| L₁ | 1 | z |
| L₂ | 2 | y |
| L₃ | 2 | y |
| L₄ | 3 | u |
| L₅ | 4 | v |

Table O — 330

| o.row | o.a | o.b |
|---|---|---|
| O₁ | 1 | 7 |
| O₂ | 1 | 9 |
| O₃ | 2 | 7 |
| O₄ | 5 | 7 |
| O₅ | 4 | 8 |

Table C — 340

| c.a | c.b |
|---|---|
| 7 | m |
| 8 | n |
| 9 | o |

350

| z | y | y | v |
|---|---|---|---|

Table L⋈O — 360

| l.row | l.a | l.b | o.row | o.a | o.b |
|---|---|---|---|---|---|
| L₁ | 1 | z | O₁ | 1 | 7 |
| L₁ | 1 | z | O₂ | 1 | 9 |
| L₂ | 2 | y | O₃ | 2 | 7 |
| L₃ | 2 | y | O₃ | 2 | 7 |
| L₅ | 4 | v | O₅ | 4 | 8 |

MJV L⋈O⋈C — 370

| l.row | l.a | l.b | o.row | o.a | o.b | c.a | c.b |
|---|---|---|---|---|---|---|---|
| L₁ | 1 | z | O₁ | 1 | 7 | 7 | m |
| L₁ | 1 | z | O₂ | 1 | 9 | 9 | o |
| L₂ | 2 | y | O₃ | 2 | 7 | 7 | m |
| L₃ | 2 | y | O₃ | 2 | 7 | 7 | m |
| L₅ | 4 | v | O₅ | 4 | 8 | 8 | n |

Table — 390

| l.row | l.a |
|---|---|
| L₁ | z |
| L₂ | y |
| L₃ | y |
| L₅ | v |

MSLOC 720 ⟶

MSLOC = SELECT l.rowid, l.c, l.sfk, o.rowid, o.c, o.pfk, c.rowid, c.c, s.rowid, s.c
FROM l, o, c, s
WHERE l.ofk = o.pk (+) AND o.cfk = c.pk (+) AND l.sfk = s.pk(+)

Query 730 ⟶

SELECT (l.c, o.c) FROM l, o ← Select List 732
WHERE l.sfk IN (SELECT s.pk FROM s WHERE (s.c = 1))  ⟵ Right Table Query Block 737
AND l.ofk = o.pk                                    ⟵ Condition 738
AND o.cfk IN (SELECT c.pk FROM c WHERE (c.c = 2)) ;
                                                    ⟵ Condition 736
                                                    ⟵ Right Table Query Block 735

Query 740 ⟶

SELECT (l.c, o.c) FROM  ← Select List 732
   ┌─ Distinguishing Columns 742
   │                      ┌─ Select List 732
(SELECT DISTINCT (l.row id, o.row id,)(l.c, o.c) FROM m
 WHERE (s.c = 1) ⟵ condition 738
 AND (c.c = 2)  ⟵ condition 739
 AND c.row id IS NOT NULL AND o.row id IS NOT NULL AND s.row id IS NOT NULL Substitute Query 742 ⎫
                      ⎬ anti-join filter 748

USING MATERIALIZED VIEW TO PROCESS A RELATED QUERY CONTAINING A ONE TO MANY LOSSLESS JOIN

RELATED APPLICATION

The present application is related to: U.S. patent application Ser. No. 09/221,649, entitled "Using a Materialized View to Process a Related Query Containing a One to Many Lossless Join", filed by Andrew Witkowski, on the equal day herewith, herein referred to as Witkowski, the contents of which are incorporated herein by reference.

1. Field of the Invention

The present invention relates to optimizing queries, and in particular, to rewriting join queries to access data through a view or from a materialized view.

2. Background of the Invention

In a database management system (DBMS), data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

The present invention is not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

For various reasons, it is not desirable for certain users to have access to all of the columns of a table. For example, one column of an employee table may hold the salaries for the employees. Under these circumstances, it may be desirable to limit access to the salary column to management, and allow all employees to have access to the other columns. To address this situation, the employees may be restricted from directly accessing the table. Instead, they may be allowed to indirectly access the appropriate columns in the table through a "view".

A view is a logical table. As logical tables, views may be queried by users as if they were a table. However, views actually present data that is extracted or derived from existing tables. Thus, the problem described above may be solved by (1) creating a view that extracts data from all columns of the employee table except the salary column, and (2) allowing all employees to access the view.

The data presented by conventional views is gathered and derived on-the-fly from the base tables in response to queries that access the views. The data gathered for the view is not persistently stored after the query accessing the view has been processed. Because the data provided by conventional views is gathered from the base tables at the time the views are accessed, the data from the views will reflect the current state of the base tables. However, the overhead associated with gathering the data from the base tables for a view every time the view is accessed may be prohibitive.

A materialized view, on the other hand, is a view for which a copy of the view data is stored separate form the base tables from which the data was originally gathered and derived. The data contained in a materialized view is referred to herein as "materialized data". Materialized views eliminate the overhead associated with gathering and deriving the view data every time a query accesses the view.

However, to provide the proper data, materialized views must be maintained to reflect the current state of the base tables. When the base tables of a materialized view are modified, computer resources must be expended to both determine whether the modifications require corresponding changes to the materialized data, and to make the required corresponding changes. Despite the high cost associated with maintaining materialized views, using a materialized view can lead to significant overall cost savings relative to a conventional view when the materialized view represents a set of data that is infrequently changed but frequently accessed.

A view is defined by metadata referred to as a view definition. The view definition contains mappings to one or more columns in the one or more tables containing the data. Columns and tables that are mapped to a view are referred to herein as base columns and base tables of the view, respectively.

Typically, the view definition is in the form of a database query. These queries, like any database query, must conform to the rules of a particular query language such as the ANSI Structured Query Language (SQL). For example, the query:

SELECT T.a FROM T WHERE T.b=1 retrieves column T.a of table T for those rows whose value in T.b equals 1. The above query includes a SELECT clause (i.e. "SELECT T.a"), a FROM clause (i.e. "FROM T"), and a WHERE clause (i.e. "T.b=1"). The FROM clause specifies one or more tables or views from which to retrieve values. The tables or views are referred to as the FROM list. The SELECT clause specifies one or more columns in the items in the FROM list from which to retrieve values. The one or more columns are referred to as the SELECT list. The WHERE clause specifies the rows from which the values are retrieved. Specifically, the WHERE clause contains one or more logical expressions defining criteria that must be meet by the rows from which values are retrieved.

Views are often based on joins of two or more tables. A join is an operation that combines rows from two or more tables and views that meet a join condition.

Figure 1:
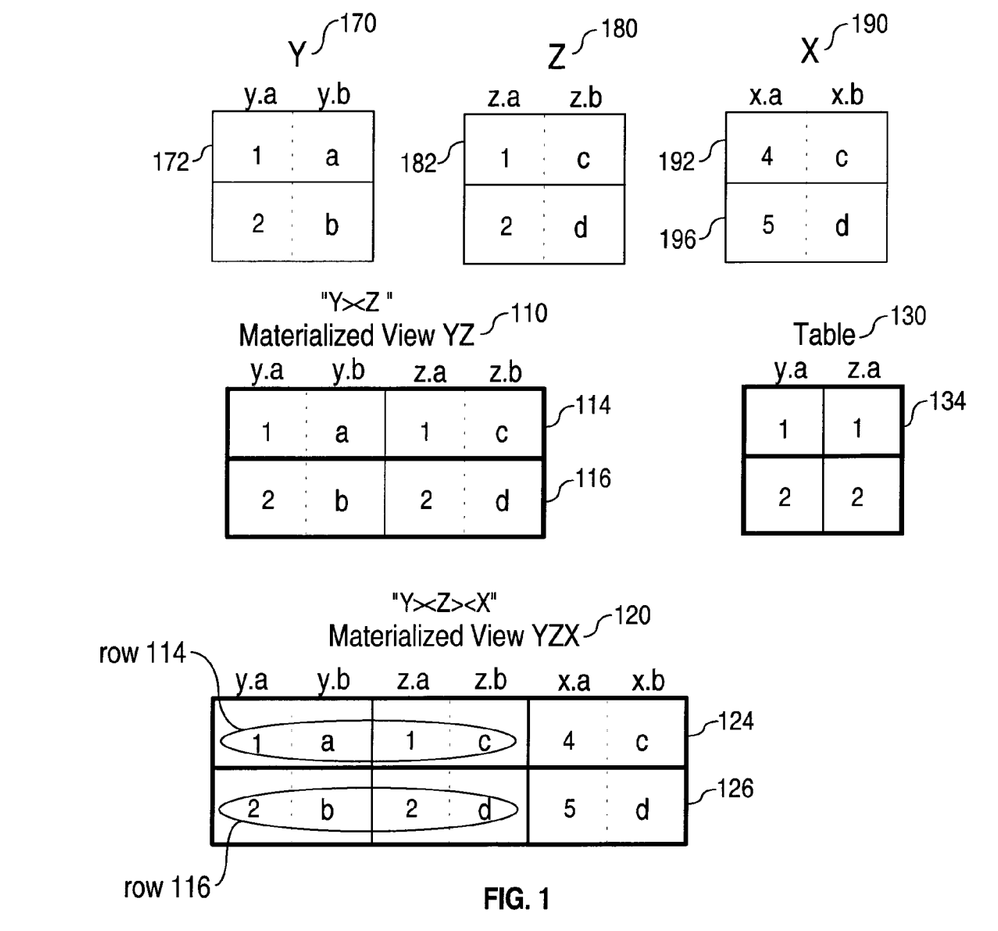
FIG. 1 is block diagram depicting tables and materialized views.

FIG. 1 shows tables that are used to illustrate a join. FIG. 1 shows tables X 190, Y 170, and Z 180. For example, materialized view YZ 110 represents the results of an "equijoin" between tables Y 170 and Z 180. An equijoin is a particular type of join where a row from a first table is combined with one or more rows from a second table, if the value in a specified column from the first table equals a value in a specified column from the second table. For example, combining the rows from table Y 170 and table Z 180 using the join condition y.a=z.a produces materialized view YZ 110. In materialized view YZ 110, row 114 was formed by combining row 172 (i.e. columns y.a and y.b in row 114) and 182 (i.e. columns z.a and z.b in row 114) because for rows 172 and 182, the value in y.a equals the value in z.a. A join is performed whenever a join is specified by a query.

As a matter of convenience, the value in a column of a row may be referred to by the label or name of the column. For example, the expression "value in y.a equals the value in z.a" may be expressed as "y.a equals z.a", or "y.a=z.a".

A join may be specified by a query by including the tables to be joined in the FROM list and including a logical expression specifying the needed join conditions in the WHERE clause. For example, the previous equijoin of tables Y 170 and Z 180 may be specified by a query as follows:

SELECT * FROM Y, Z WHERE y.a=z.a

In addition to join conditions, the WHERE clause of a join query can also contain other conditions that refer to columns of only one table. These conditions can further restrict the rows returned by the join query.

Generating joins in response to receiving join queries can require a substantial amount of processing. To reduce the amount of such processing, a database manager transforms join queries to retrieve data from the "preprocessed" materialized data residing in a materialized view. Currently, database systems that include query rewrite mechanisms rewrite some types of join queries but not other types of join queries.

An example of a query not transformed under the conventional approach is a query based on a semijoin. Let $W \mathbin{>\mkern-6mu-}_{p(w,t)} T$ denote a semijoin between tables W and T on condition p(w,t). A semijoin results in another table that consists of rows in W that match the condition p(w,t). If the condition is not relevant, a shorter notation W>-T is used to represent the semijoin. The first table W is referred to as the "left" table, and the second table T as the "right" table with respect to the semijoin. Note that the notation W>-T represents the same semijoin as the notation T-<W. Typically, the condition of a semijoin requires that a column from the left table match the value of a column in the right table. Structures shown in FIG. 2 are used as an example to illustrate a semijoin.

Figure 2:
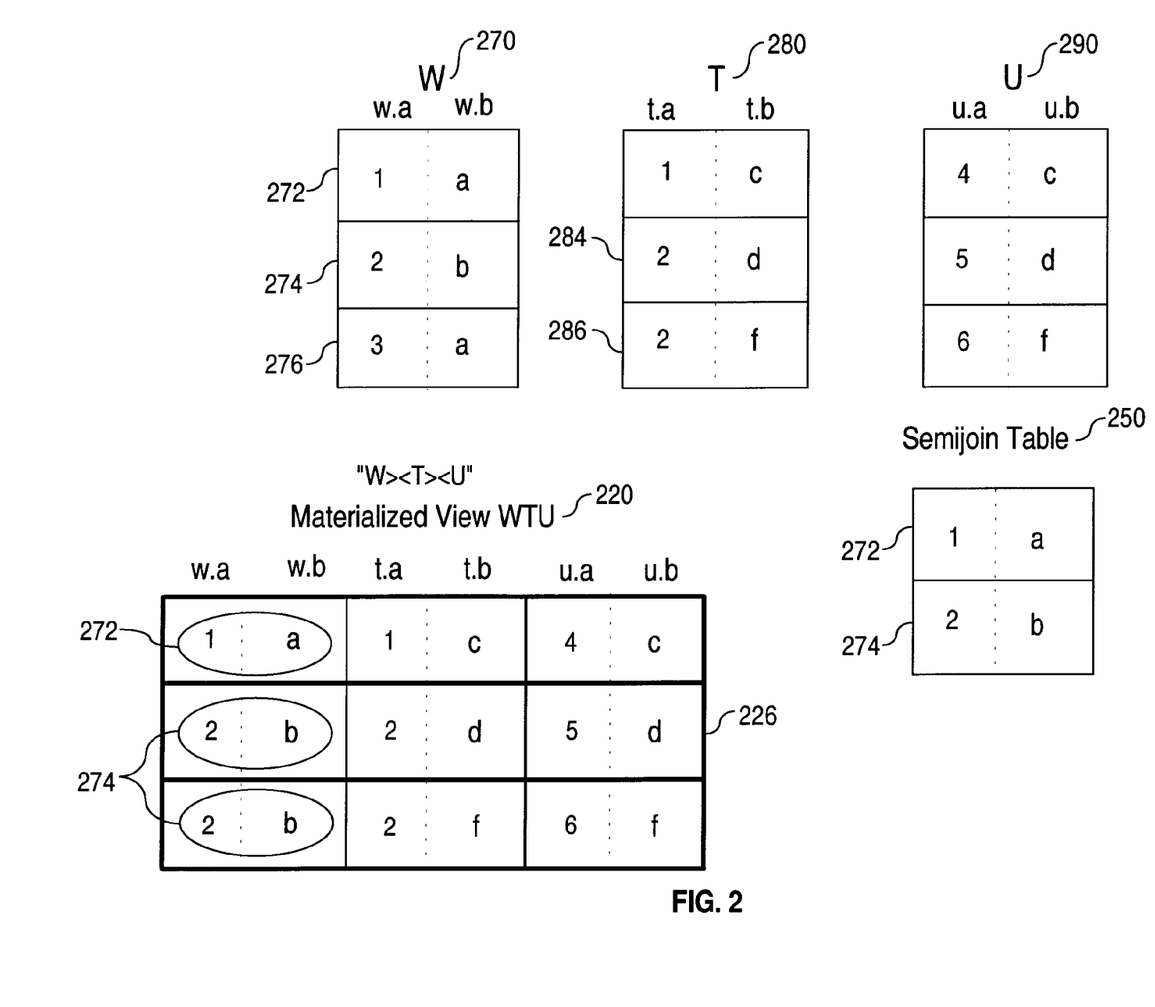
FIG. 2 is block diagram depicting tables and materialized views used to illustrate a semijoin.

FIG. 2 shows table W 270 and T 280 and semijoin table 250. Semijoin table 250 represents the results of a semijoin between table W 270 and table T 280 through the condition w.a equals t.a. Row 272 and row 274 are reflected in semijoin table 250 because each match the condition. With respect to row 274, although two rows in table T 280 match the condition w.a=t.a (i.e. row 284 and row 286), only one row in semijoin table 250 reflects row 274. No row in table T 280 meets the join condition with respect to row 276.

Materialized view WTU 220 is an example of a materialized view that contains data that may used to satisfy the above semijoin query. Materialized view WTU 220 is based on join W><T><U, where w.a=t.a and t.b=u.b. Materialized view WTU 220 contains row 272 and two copies of row 274, which represent data that may used to satisfy the above mentioned semijoin query.

Because using the "preprocessed" materialized data of a materialized view frequently saves the computer resources required to process queries, it is desirable to provide a method of satisfying a query from the materialized data of a materialized view that contains data that may used to satisfy semijoin queries.

SUMMARY OF THE INVENTION

A method and apparatus for transforming queries is described. According to an aspect of the present invention, a select-project-join query Q that specifies at least one semijoin is rewritten into another query that references the materialized view M. A common section shared by the select-project-join query and the materialized view includes the tables being semijoined.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for transforming queries is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Terms and Notations

For the purpose of explanation, the following terms and conventions are used herein to describe embodiments of the invention:

Let $R \mathbin{><}_{p(r,s)} S$ denote an inner join between tables R and S on condition p(r,s). The result is another table which consists of all rows from R and S that satisfy the condition p(r,s). For example, $R \mathbin{><}_{r.c=s.c} S$ is an inner join of R and S on condition r.c=s.c. If the condition is not relevant to the context of discussion, a shorter notation R><S may be used.

Let $R \mathbin{\text{->}}_{p(r,s)} S$ denote an outer join between tables R (the outer table) and S (the inner table) on condition p(r,s). An outer join contains all rows from R and S that satisfy the condition p(r,s) and all remaining rows from R, the outer table, that do not satisfy the condition p(r,s). The latter rows are called the antijoin rows. All columns from S (i.e. inner table) are set to null for the antijoin rows.

A select-project-join query is a query that contains joins, selections on individual tables, and projections on a subset of columns of individual tables. A "selection" is a subset of rows of a table that satisfy some condition. For example, r.c=1 is a selection on rows of R where column c is 1. A "projection" is a subset of columns of a table. The ANSI SQL query language defines the projection with the SELECT clause, which lists the projected columns of tables and defines the selection and join with the WHERE clause. For example, SELECT r.c, s.c FROM R, S WHERE r.c=s.c AND r.x=1 AND s.y=1, projects the join $R><_{r.c=s.c}S$ on columns r.c and s.c and restricts the tables R and S to rows where r.x=1 and s.y=1 respectively.

A join is compatible with a given join if the join contains all rows of a given join. For example, $R><_{r.a=t.a}S$, and $R->_{r.a=t.a}S$ are compatible with $R->_{r.a=t.a}S$.

A unique key (UK) is a column or set of columns that uniquely identify rows in a table. At least one column of a UK must be not null. One of the UKs of a table may be designated as a primary key (PK).

A join R><S is lossless with respect to R if it preserves all rows of R. By convention we will place the preserved table R, as the first table in the join and will sometimes skip the phrase 'with respect to R'. A left outer join R->S naturally preserves all rows of R, and is thus lossless.

A join J1 is derivable from a given join J2, if the join J1 can be derived from J2. For example, an inner join $J1=R><_{r.a=t.a}S$ is derivable from the outer join $J2=R->_{r.a=t.a}S$ as we can filter the antijoin rows from J2 to obtain J1. Observe that a join is derivable from itself. A semi-join $R>-_{r.a=t.a}S$ is derivable from inner join $R><_{r.a=t.a}S$ as well as from outer join $R->_{r.a=t.a}S$. Antijoin $R-<_{r.a=t.a}S$ is derivable from outer join $R->_{r.a=t.a}S$.

A join R><S is a one-to-one join if a row from R joins with at most one row from S. A join R><S is one-to-one lossless with respect to R if the join is lossless with respect to R and one-to-one with respect to R.

A join R><S is one-to-many if a row from R joins with more than one row from S.

Referential Integrity is a relationship between columns of two tables where the values of the columns of one table, called the child columns, are limited to the set of values in the columns of the other table, called the parent columns. The R.c column is referred to as being referentially constrained by the S.c column. Observe that the join $R><_{r.c=s.c}S$ where the column R.c is referentially constrained by the S.c column is lossless.

A rowid pseudo-column contains a unique identifier for each row in a table. A pseudo-column may, for example, simply represent the values of the actual storage locations at which the rows are stored.

In ANSI SQL tables may contain duplicate rows. A DISTINCT operator is provided to eliminate duplicates of rows that have the same values in a specified set of columns. For example:

SELECT DISTINCT T.a, T.b FROM T returns only distinct two-column rows from T even if T originally contained duplicates.

Specifying a Semijoin in a Query Language

A query may specify a semijoin operation using a variety of syntactical constructs. However, for purposes of illustration, the transformation techniques of the present invention shall be explained with reference to a query using an IN operator. The semijoin between table W 270 (FIG. 2) and table T 280 based on the condition w.a=t.a described earlier may be specified by the following query:

SELECT w.a, w.b FROM W WHERE w.a IN (SELECT t.a FROM T)

The IN operator operates upon a left operand and right operand. If the value specified by the left operand is included in the set of values specified by the right operand, then the IN operator evaluates to true. In the logical expression "w.a IN (SELECT t.a FROM T)", the set of values specified by the right operand are the values returned by the query block "(SELECT t.a FROM T)", (i.e. the values in column t.a.). Thus, for a given row in table W 270, the IN operator evaluates to TRUE if w.a is equal to t.a in any row in table 280.

As demonstrated above, a query specifying a semijoin of two tables may be based on an IN operator, where the left operand is the left table column that is part of the join condition (i.e. w.a), and the right operand is a query block referencing the right table and having a SELECT list that includes the right table column that is part of the join condition (i.e. t.a). The query block that is the right operand is referred to as the "right table query block".

A query specifying a semijoin may be rewritten to a query based on an inner join between the two semijoined tables and the join condition of the semijoin. For example, assuming table W contains rowid pseudo-column w.rowid, the above query specifying a semijoin between table W 270 and table T 280 may be rewritten as:

SELECT w.a, w.b FROM (SELECT DISTINCT w.rowid, w.a, w.b
FROM W, T
WHERE w.a=t.a)

In addition to constructs using an IN operator, a query specifying a semijoin may be rewritten based on a construct that uses an EXIST operator. For example, to specify W>-T, the following query may be used:

SELECT w.a, w.b FROM W WHERE EXIST (SELECT t.a FROM T WHERE t.a=w.a)

Query Graphs

Figure 3A:
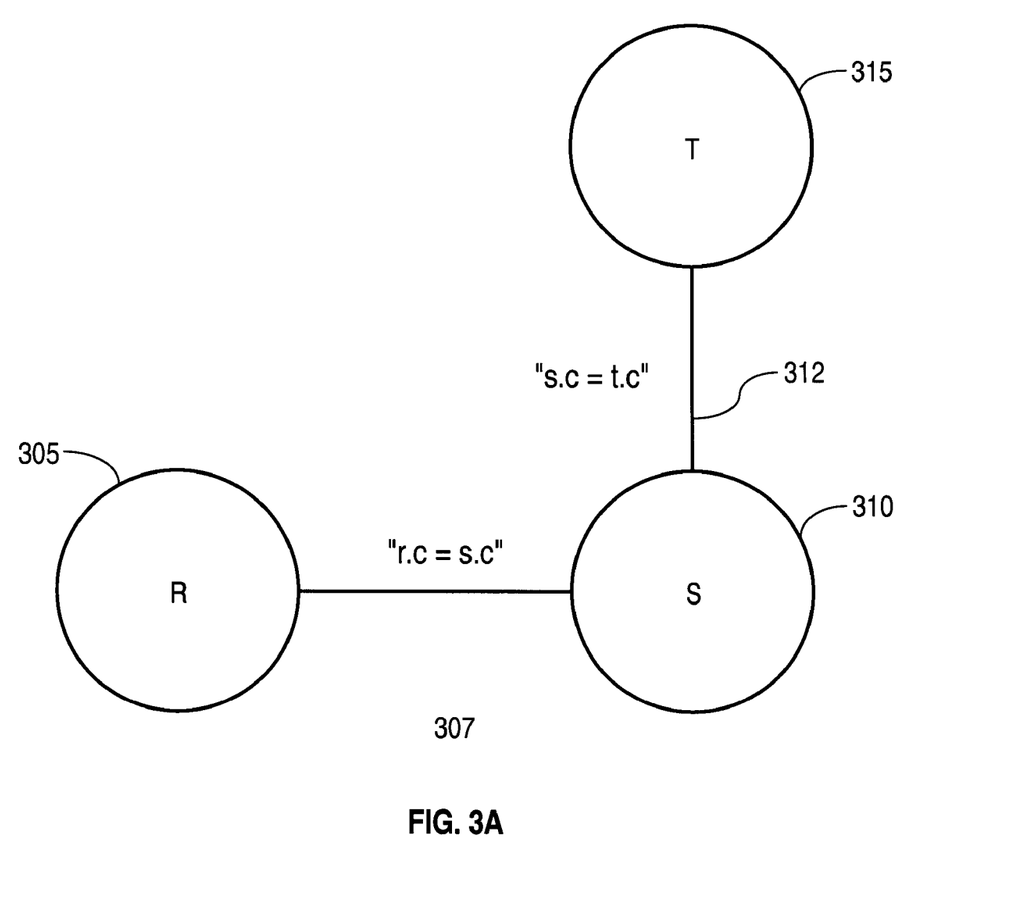
FIG. 3A is a query subgraph according to an embodiment of the present invention.

FIG. 3A shows a query graph, which is a graphical representation of joins in a query. Nodes in the graph represent tables and edges represent joins. For example, the query graph in FIG. 3A represents a query specifying the join $R><_{r.c=t.c}S><_{s.c=t.c}T$, or R><S><T for short. The query joins tables R, S and T on the condition (r.c=s.c and s.c=t.c). Node 305 represents table R, node 310 table S, and node 315 table T. Edge 307 represents $R><_{r.c=s.c}S$, and edge 312 represents $S><_{s.c=t.c}T$.

Rewrites Based on Query Graphs

According to an embodiment of the present invention, during a rewrite of query block Q with materialized view M, the join graph G(M) of a materialized view M is compared with the join graph G(Q) of a query block to identify three join subgraphs. The "intersection subgraph" G(I) represents the nodes and edges overlapped by G(M) and G(Q), so G(I)=G(M)∩G(Q). The nodes and edges of G(M) that belong to G(I) are referred to as $G_M(I)$, and the nodes and edges of G(Q) that belong to G(Q) are referred to as GQ(I). The "delta subgraph" ΔG(Q) represents the part of G(Q) that is not in G(I), so ΔG(Q)=G(Q)=$G_Q(I)$. The "materialized view delta subgraph" ΔG(M) represents the part of G(M) that is not in G(I), so ΔG(M)=G(M)=GM(I). For example, if query Q semijoins tables $R>-_{r.a=s.a}S$ and materialized view M joins $R><_{r.a=s.a}S><_{s.b=t.b}T><_{t.a=u.a}U$, then the intersection subgraph may be expressed as $G_M(I)$=R><S, or $G_Q(I)$= R>-S. When the distinction between $G_M(I)$ and $G_Q(I)$ is unimportant, then G(I) may be used to refer to either of them. The materialized view delta subgraph ΔG(M) is T><U.

The set of joins that correspond to the intersection subgraph G(I) are referred to as the "common section" (i.e. R><S), the set of joins that correspond to the delta subgraph ΔG(Q) are referred to as the "query delta" (i.e. O><P), and the set of joins that correspond to the materialized view delta subgraph ΔG(M) are referred to as the "materialized view delta" (T><U).

Rewrite queries that specify semijoins may decompose a query graph G(Q) into a join between the delta query subgraph ΔG(Q) and the intersection graph $G_Q(I)$, i.e., G(Q)=ΔG(Q)><$G_Q(I)$. The query may be rewritten to replace the $G_Q(I)$ common section with a materialized view, e.g., G(Q)=ΔG(Q)><G(M). Thus the algorithms recover G(Q) by joining ΔG(Q) to the materialized view G(M). This transformation is possible only when certain tests referred too as rewrite tests are satisfied. Select-project-join queries have two tests.

A. The Join Compatibility Test requires that:
  1. The intersection subgraph $G_Q(I)$ must be contain the tables being semijoined by G(Q).
  2. The join of $G_M(I)$ to ΔG(M), (e.g. $G_M(I)$><ΔG(M)) is one-to-one lossless with respect to $G_M(I)$.
  3. $G_Q(I)$ are derivable from $G_M(I)$.

B. The Data Sufficiency Test requires that all columns of matching tables in the query other than the join columns be either equal to or functionally determined by columns in a materialized view.

For example, assume that query Q is based on joins R>-$_{r.a=s.a}$S and materialized view M is based on joins R><$_{r.a=s.a}$S><$_{s.c=t.c}$T. Then $G_M(I)$=R><S, and ΔG(M)=T. If $G_M(I)$><ΔG(M) is one-to-one lossless, i.e., in this case if (R><S)><T is lossless, then query Q can be rewritten from M.

Database metadata may be examined to determine whether (R><S)><T is lossless. Specifically, if S.c column is referentially constrained by the T.c column, then (R><S) ><$_{s.c=t.c}$T is lossless. Alternatively, the view definition of materialized view M may be examined to determine whether the join between S and T is an outer join, i.e., the materialized view definition specifies (R><S)->$_{s.c=t.c}$T. If so, then (R><S)->$_{s.c=t.c}$T is lossless. Furthermore, if column T.c is unique, due to for example a unique constraint on T.c, then the join (R><S)->$_{s.c=t.c}$T is one-to-one lossless. The query Q may thus be rewritten to reference the materialized view M.

In the above example, ΔG(M) contained only one table T. Determining losslessness is more complicated when ΔG(M) contains more tables. For example, consider materialized view M that joins four tables R><S><$_{s.c=t.c}$T><$_{t.c=w.c}$W. Then $G_M(I)$=R><S, and ΔG(M)=T><W. Rewrite with M is possible if join (R><S)><$_{s.c=t.c}$W.(T><$_{t.c=w.c}$W) is one-to-one lossless. This occurs if the innerjoins S><$_{s.c=t.c}$T and T><$_{t.c=w.c}$W are lossless. The first join joins T to $G_M(I)$ and the second is an internal join in ΔG(M). If S.c is referentially constrained by T.c and column T.c is referentially constrained by column W.c, then (R><S)><$_{s.c=t.c}$( T><$_{t.c=w.c}$W) is lossless. Furthermore, if columns T.c and W.c are also unique, then (R><S)><$_{s.c=t.c}$( T><$_{t.c=w.c}$W) is one-to-one lossless. Another sufficient condition is that the join between S and T is an outer join, i.e., if M=(R><S)->$_{s.c=t.c}$ (T><$_{t.c=w.c}$W). Furthermore, if columns T.c and W.c are unique, then (R><S)->$_{s.c=t.c}$( T><$_{t.c=wc}$W) is one-to-one lossless.

Functional Overview

According to an aspect of the present invention, a select-project-join query Q is rewritten into another query Q that references a materialized view M in place of the tables being semijoined and the tables in ΔG(Q). The join between $G_M(I)$ and ΔG(M) may result in the duplication of G(I) rows. The duplicated rows can be eliminated by using, for example, the DISTINCT operator of the ANSI SQL language and placing a materialized view M in a new query block that contains a DISTINCT operator. The materialized view should, in this case, contain columns which allows us to uniquely distinguish individual rows of the intersection subgraph G(I).

Exemplary Materialized View

The techniques described herein transform a first query specifying a semijoin into a second query that uses a materialized view. To illustrate an embodiment of the present invention, structures depicted in FIG. 3B, queries shown in FIG. 4, and the query graphs shown in FIG. 5 are provided as example.

Figure 3B:
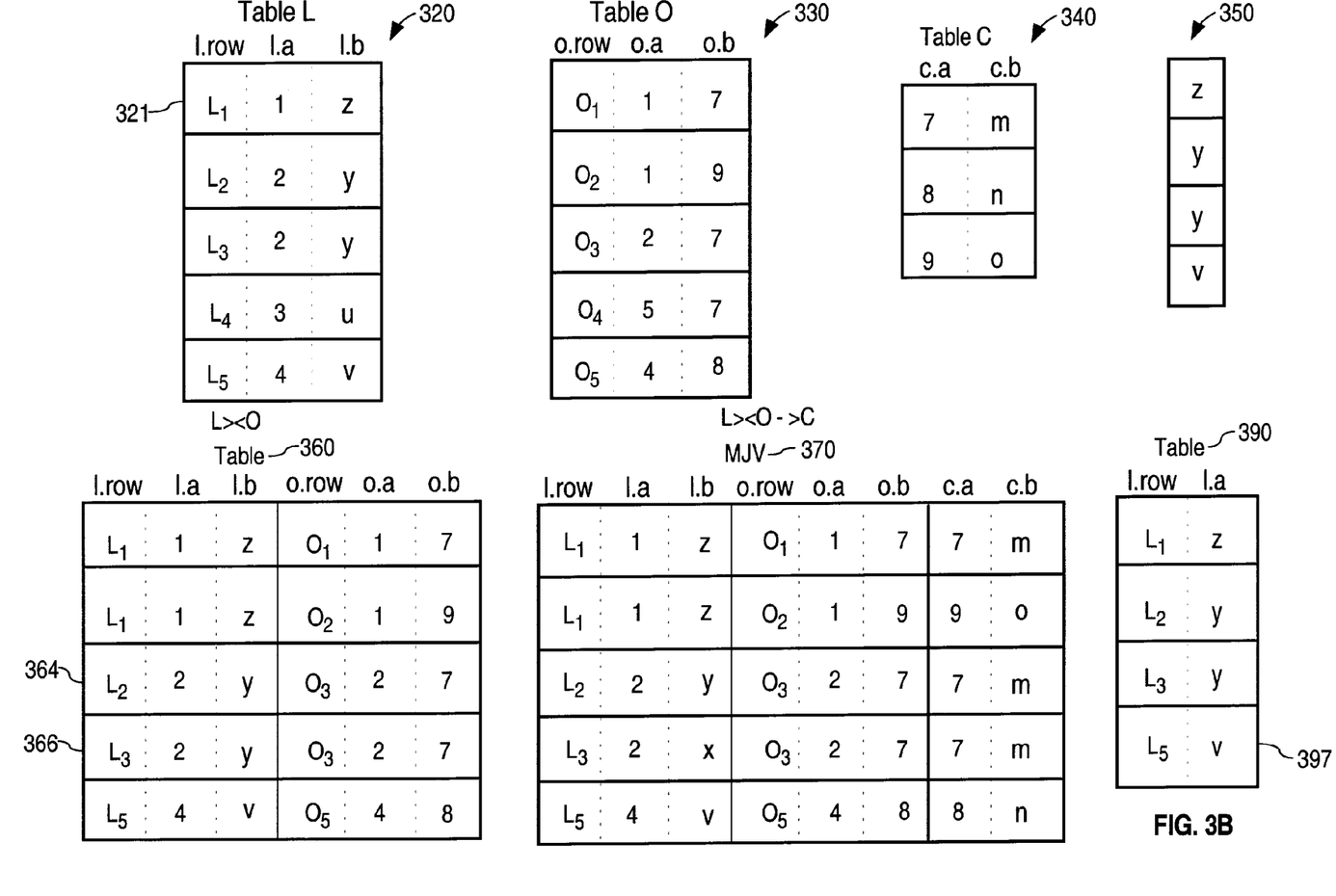
FIG. 3B is a block diagram depicting tables and a materialized view used to illustrate query transformation according to an embodiment of the present invention.

FIG. 3B is block diagram showing tables L 320, O 330, and C 340. Table L 320 has rowid pseudo-column l.row, and columns l.a and l.b. The value $L_1$ in l.row for row 321 uniquely identifies row 321 in table L 320.

Like table L 320, table O 330 has a rowid pseudo-column o.row, and columns o.a and o.b. Tables C 340 has columns c.a and column c.b.

MJV 370 is a materialized view based on L><$_{l.a=o.a}$O-<$_{o.b=c.a}$C. Table 360 represents L><$_{l.a=o.a}$O. The join represented by MJV 370 is one-to-one with respect to L><O.

Figure 4:
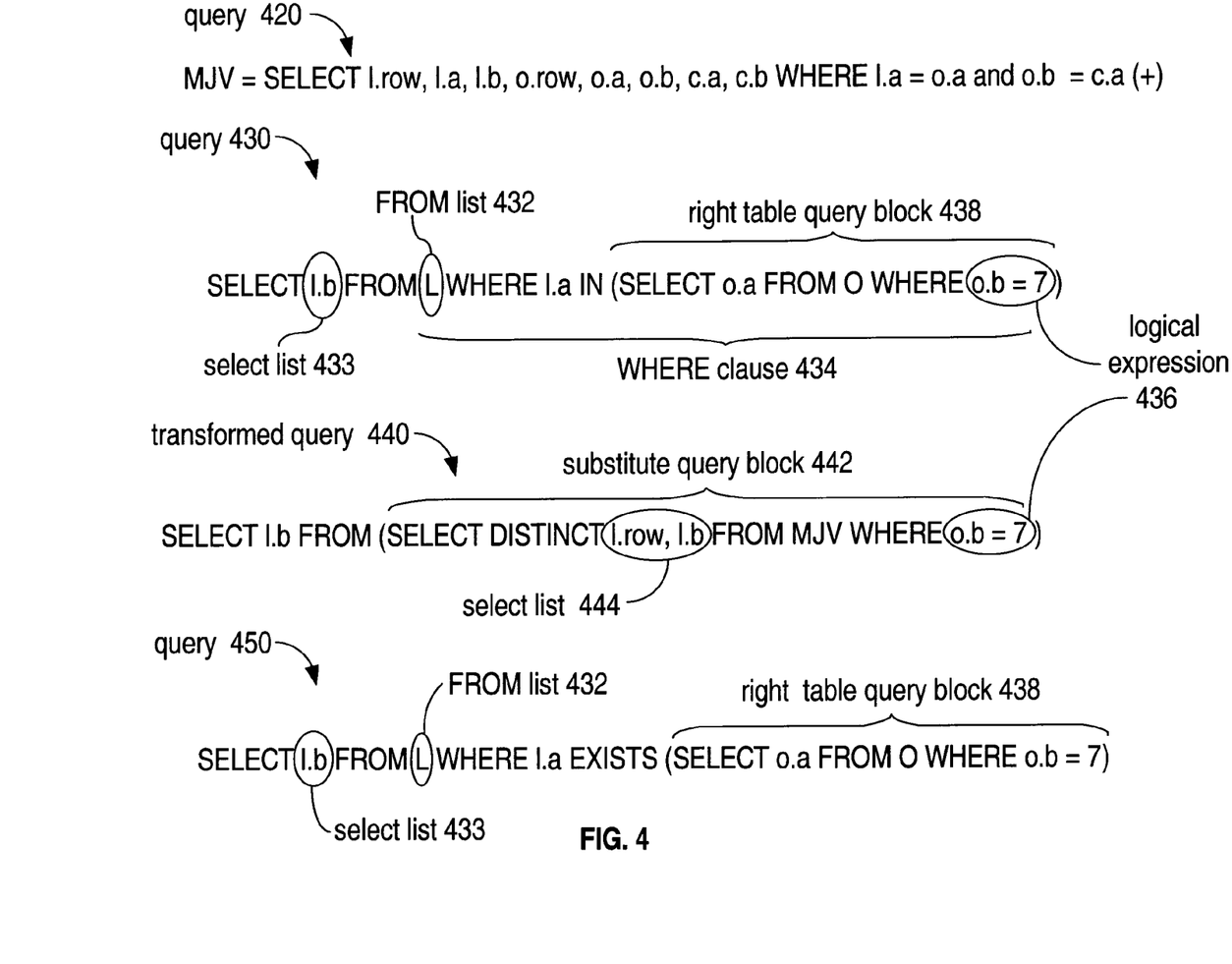
FIG. 4 is a diagram depicting a given query to be transformed, a query upon which a materialized view is based, and a transformation query resulting from the transformation of the given query according to an embodiment of the present invention.
Figure 5:
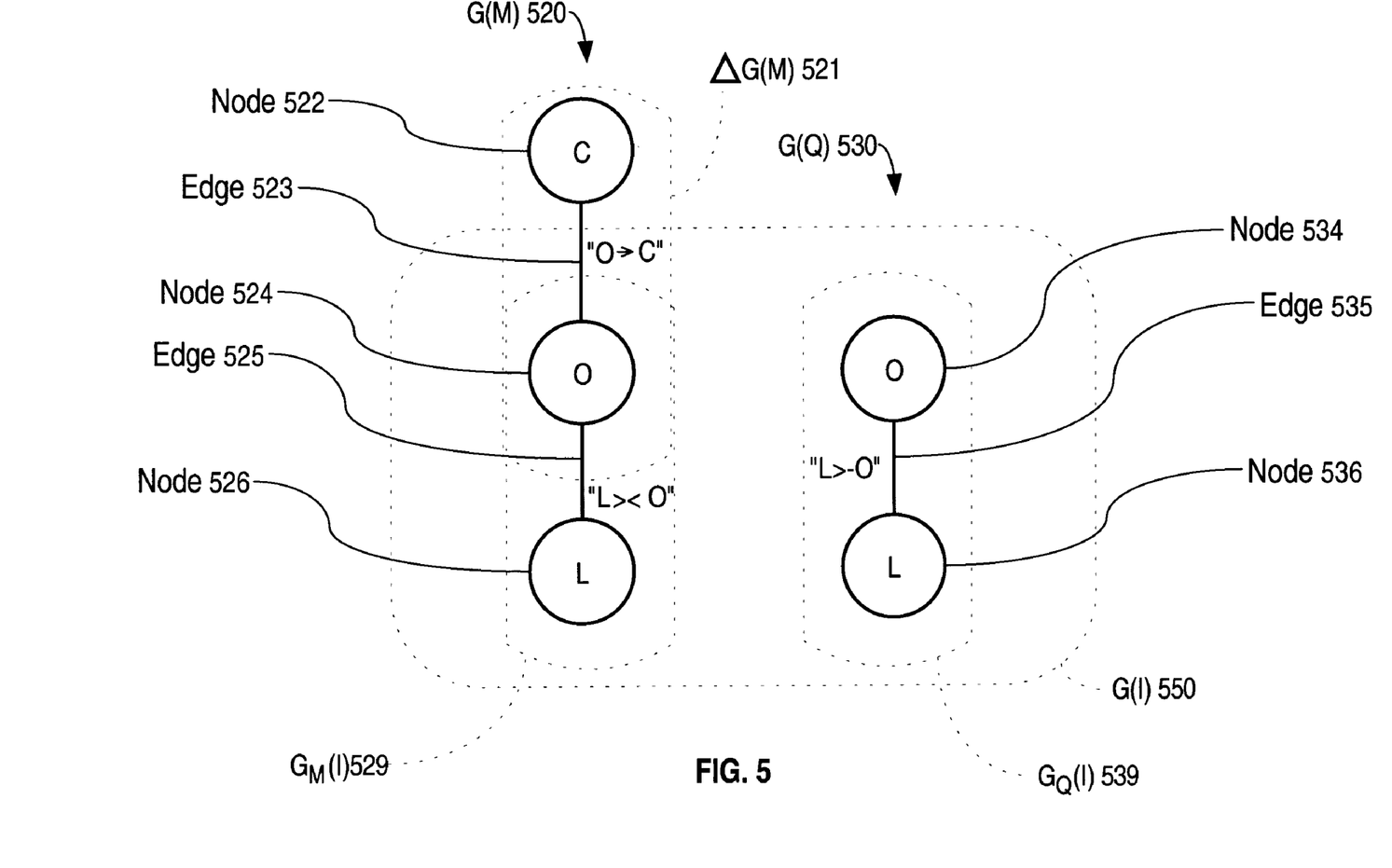
FIG. 5 is a query graph of a given query and materialized view used to illustration an embodiment of the present invention.

FIG. 4 shows the query 420, the view definition for MJV 370. Query 420 specifies L><O->C. Query 430 is the given query used to illustrate the steps of FIG. 6. Query 430 specifies L>-$_{l.a=o.a}$O.

FIG. 5 shows query graph G(M) 520, the query graph for MJV 370, and G(Q) 530, the query graph for query 430. G(M) 520 includes node 522, which represents table C 340, node 524 which represents table O 330, and node 526 which represents table L 320. Edge 523 represents O->C, and edge 525 represents L><O. G(Q) 530 includes node 534, which represents table O 330, and node 536 which represents table L 320. Edge 535 represents L>-O.

Transforming a Query Specifying a Semijoin

Figure 6:
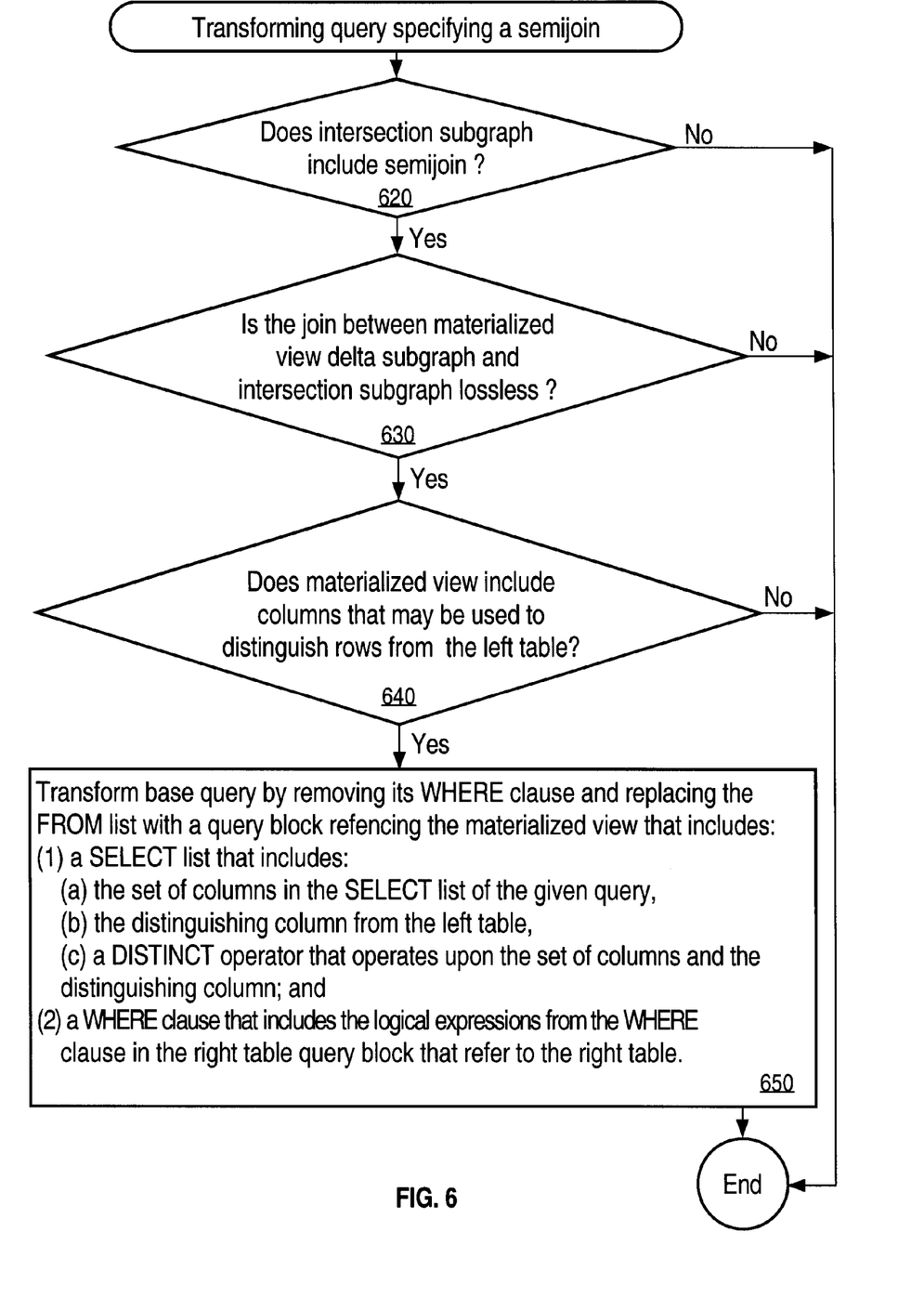
FIG. 6 is a flow chart depicting steps for transforming a query according to an embodiment of the present invention.

FIG. 6 shows the steps for transforming a given query that contains a semijoin into a transformed query that uses a materialized view, where ΔG(M) and G(I) is one-to-one lossless. According to an embodiment of the present invention, the steps may be performed by a database manager in response to the database manager receiving a given query that specifies a semijoin. In response to receiving the query, typically a database manager performs various optimization procedures to determine whether the query may be transformed into a more efficient query.

According to an embodiment of the present invention, the optimization procedures include execution of the steps shown in FIG. 6. The steps may be executed after the database manager selects a materialized view for examination, in order to determine whether the selected materialized view may be used to transform the given query. After the database manager determines that the materialized view meets the data sufficiency test, the steps of FIG. 6 are performed. In the example used to illustrate the steps shown in FIG. 6, the given query received is query 430, and the materialized view being examined is materialized view MJV 370. Query 430 specifies base semijoin L>-O.

Referring to FIG. 6, at step 620, it is determined whether the query graphs for the given query and materialized view form an intersection subgraph that includes the semijoin. This determination is made by comparing query graphs for the materialized view and the given query. In this example, the determination is made by comparing the query graph G(Q) 530 of query 430, and the query graph G(M) 520 of materialized view definition 420. G(M) 520 and G(Q) 530 form intersection subgraph graph G(I) 550, i.e. $G_M(I)$ 529= L><O, and $G_Q(I)$ 539=L>-O. $G_Q(I)$ includes the semijoin. Thus, control flows to step 630.

At step 630, it is determined whether the join between the materialized view delta subgraph ΔG(M) and the intersection subgraph $G_M(I)$ is one-to-one lossless. If the join is one-to-one lossless, execution of the steps ceases. Otherwise, control passes to step 640. In this example, ΔG(M) 521 is outerjoined to $G_M(I)$ 529. Assume c.a is subject to a uniqueness constraint. Because c.a is subject to a unique constraint, and outerjoins are inherently lossless, the determination is that the join is one-to-one lossless. Control then passes to step 640.

At step 640, it is determined whether the view definition specifies one or more distinguishing columns that may be used to uniquely distinguish each row in the left table from all other rows in the left table. If there are no distinguishing columns, then execution of the steps ceases. Otherwise, control flows to step 650.

There are a variety of techniques that may be used to determine whether the selected materialized view query specifies a distinguishing column. For example, a materialized view query may be examined to determine whether the SELECT list contains a column that uniquely identifies the rows in the right table. Examples of columns which uniquely identify rows are a rowid pseudo-column, a uniquely constrained column, and a unique key column. In this example, it is determined that a pseudo rowid column for (i.e. i.row) table L 320 is contained in the SELECT list of the materialized view query (i.e query 420). Therefore, control flows to step 650.

At step 650, the given query is transformed by removing the WHERE clause and replacing the FROM list with a substitute query block referencing the materialized view. The substitute query block has:

(1) a SELECT list that includes:
  (a) the set of columns in the SELECT list of the given query,
  (b) the distinguishing column from the left table as determined in step 640,
  (c) a DISTINCT operator that operates upon the set of columns and the distinguishing column; and
(2) a WHERE clause that includes the logical expressions from the WHERE clause in the right table query block that refer to the right table.

In this example, the query 430 is transformed into transformed query 440. Specifically, the WHERE clause 434 is removed. FROM list 432 is replaced with substitute query block 442, which is a query block referencing materialized view MJV 370. The SELECT list 444 of substitute query block 442 includes:

(1) l.b, the column from SELECT list 433,
(2) l.row, the distinguishing column determined at step 640, and
(3) a DISTINCT operator that operates upon l.b and l.row.

The WHERE clause contains logical expression 436 from right table query block 438.

After the query 430 is transformed into transformed query 440, it may be executed. First, the results of the query block 442 are generated. Table 390 represents the resulting rows. Due to the application of the DISTINCT operator, row 368, which was duplicated in MJV 370, is reflected only once by row 397 in table 390. Because the DISTINCT operator operates upon l.row in addition to l.b, a unique row is not eliminated by the DISTINCT operator because the row contains identical values in the column requested by the query 430, i.e. l.b. For example, row 364 and row 366, which contain the identical values in column l.b i.e., are both reflected in table 390.

Finally, a table having one column l.b is generated from table 390. This results in table 370, which represents the set of data that would have been returned by the query 430.

One-to-Many Transformations

Witkowski describes techniques for transforming a query where the join between ΔG(M) and $G_M(I)$ is one-to-many. These techniques may be applied to queries that specify semijoins. Assume that in the current example that ΔG(M) and $G_M(I)$ is one-to-many lossless, i.e. (L><0)->C. Under these conditions, query 430 may be transformed by replacing the materialized view MJV 370 with the query block (SELECT DISTINCT l.row, l.b, o.row FROM MJV), resulting in the following transformed query:

SELECT l.b FROM (SELECT DISTINCT l.row, l.b FROM (SELECT l.row, l..b, o.row FROM MJV) WHERE o.b=7)

Semijoins Between Left Tables Representing Joins

In some queries that specify a semijoin, the left table is a join of two or more tables. In these situations, at step 640, the determination includes determining whether the view definition specifies additional distinguishing columns for each table joined in the left table that is not participating in the semijoin. At step 650, the SELECT list of the transformed query contains the additional distinguishing columns. The following given query Q and materialized view LOC are provided as an illustration.

Q=SELECT l.a, j.a FROM L,J WHERE l.a IN (SELECT o.a FROM O)

LOC=SELECT l.row, l.a, o.row, o.a, o.b, c.a, c.b, j.row, j.a FROM L, O, C, J
WHERE j.a=l.b(+) and l.a=o.a(+) and o.b=c.b(+)

Thus $G(M) = J{-}>_{j.a=l.b} L{>}{-}_{l.a=o.a} O{-}>_{o.b=c.b} C$ and $G(Q) = J{-}>_{j.a=l.b} L, >{-}_{l.a=o.a} O$, ΔG(M)=O->C, and $G_M(I)$=J->L->O. Query Q may be rewritten as:

SELECT l.a, j.a FROM (SELECT l.a, j.a, l.row, j.row FROM LOC)

Transforming Queries that Specify Multiple Semijoins

Some queries may specify multiple semijoins. These queries may be transformed as well.

Figure 7:
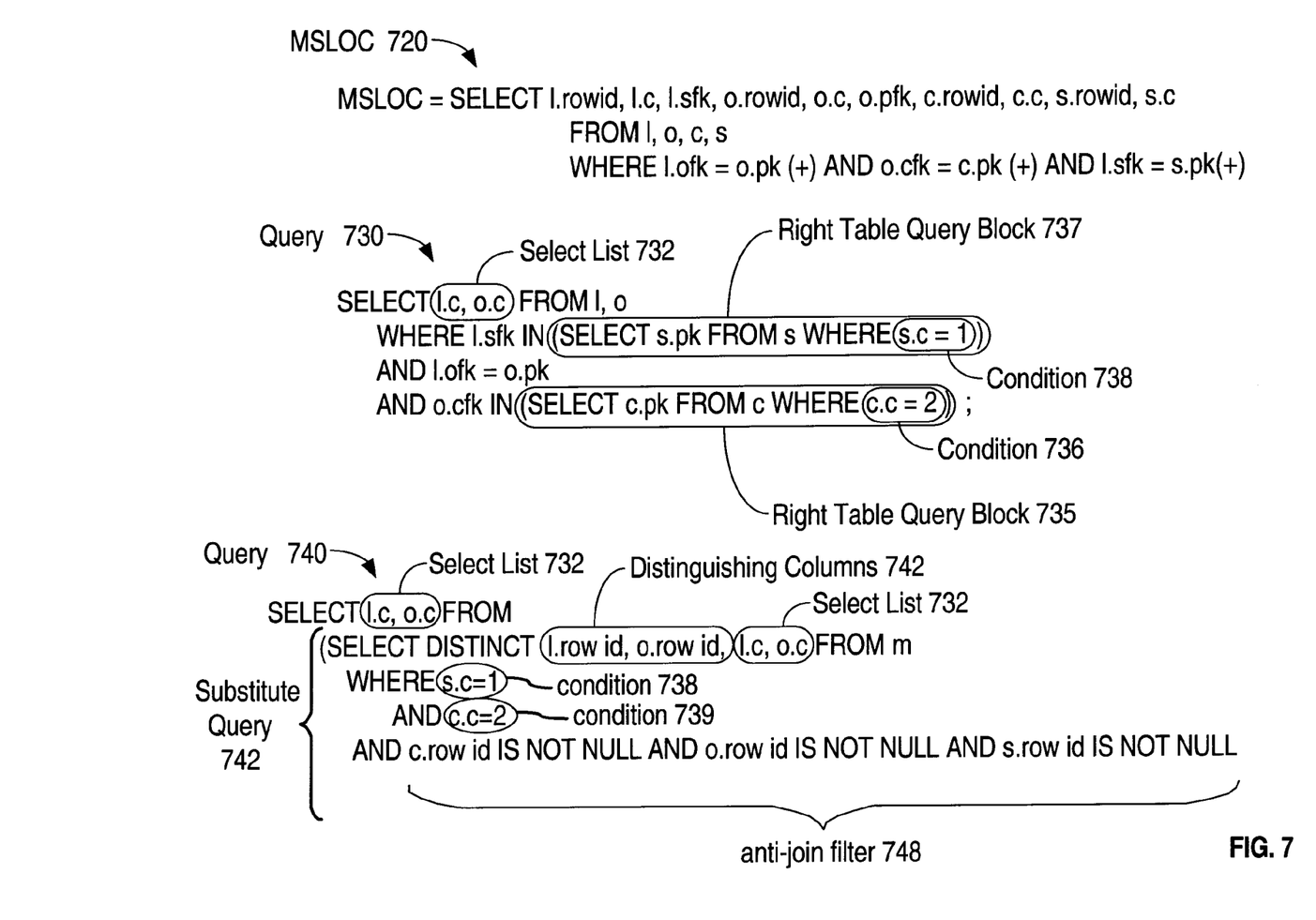
FIG. 7 is a diagram depicting queries used to illustrate the transformation of a given query that specifies multiple semijoins according to an embodiment of the present invention.

FIG. 7 shows an example of a given query that specifies multiple semijoins, and an exemplary materialized view used to illustrate a transformation of the given query. Given query 730 specifies S-<L><O>-C, or more particularly $S{-}<_{l.sfk=s.pk} L{>}<_{l.ofk=o.pk} O{>}{-}_{o.cfk=o.pk} C$. MSLOC 720 is based on S<-L><O->C, or more particularly, $S<{-}_{l.sfk=s.pk} L{-}>_{l.ofk=o.pk} O{-}>_{o.fk=c.pk} C$. $G_Q(I)$=S-<L->O>-C, and $G_M(I)$=S<-L->O->C.

Query 730 may be transformed into a query that references MSLOC 720 if the join between ΔG(M) and the intersection subgraph $G_M(I)$ is lossless. If so, given query 730 may be transformed by the replacing the FROM list and the join conditions of $G_Q(I)$ in the WHERE clause with a substitute query block that references MSLOC as specified below. Transformed query 740, which includes substitute query block 742, illustrates how query 730 may be transformed. Substitute query block 742 has:

(1) a SELECT list that includes:
  (a) the set of columns in the SELECT list of the given query (i.e. select list 732);

(b) distinguishing columns from the left table of each semijoin specified by the given query (i.e. distinguishing columns 742);

(c) a DISTINCT operator that operates upon the set of columns and the distinguishing columns; and (2) a WHERE clause that includes:

any logical expressions from the WHERE clause in the right table query blocks (i.e. condition 738 in right table query block 737, and condition 736 in right table query 735);

and an antijoin filter (i.e. antijoin filter 748). An antijoin filter is a condition added to a WHERE clause that filters any antijoin rows.

While the present invention is illustrated using as an example the transforming of a query that specifies a semijoin using the IN operator, the present invention may be used to transform alternative constructs that are used to specify semijoins. Therefore, it is understood that the present invention is not limited to transforming queries based on the IN operator. For example, the present invention may be used to transform a query that specifies L->O using query block 450, which is based on an EXISTS operator. Query block 450 contains query components that are identical to query components of query 430, i.e. select list 433, FROM list 432, and right table query block 438. Query block 450 may be transformed in accordance with steps shown in FIG. 6 by operating upon these components in the manner previously described.

Hardware Overview

Figure 8:
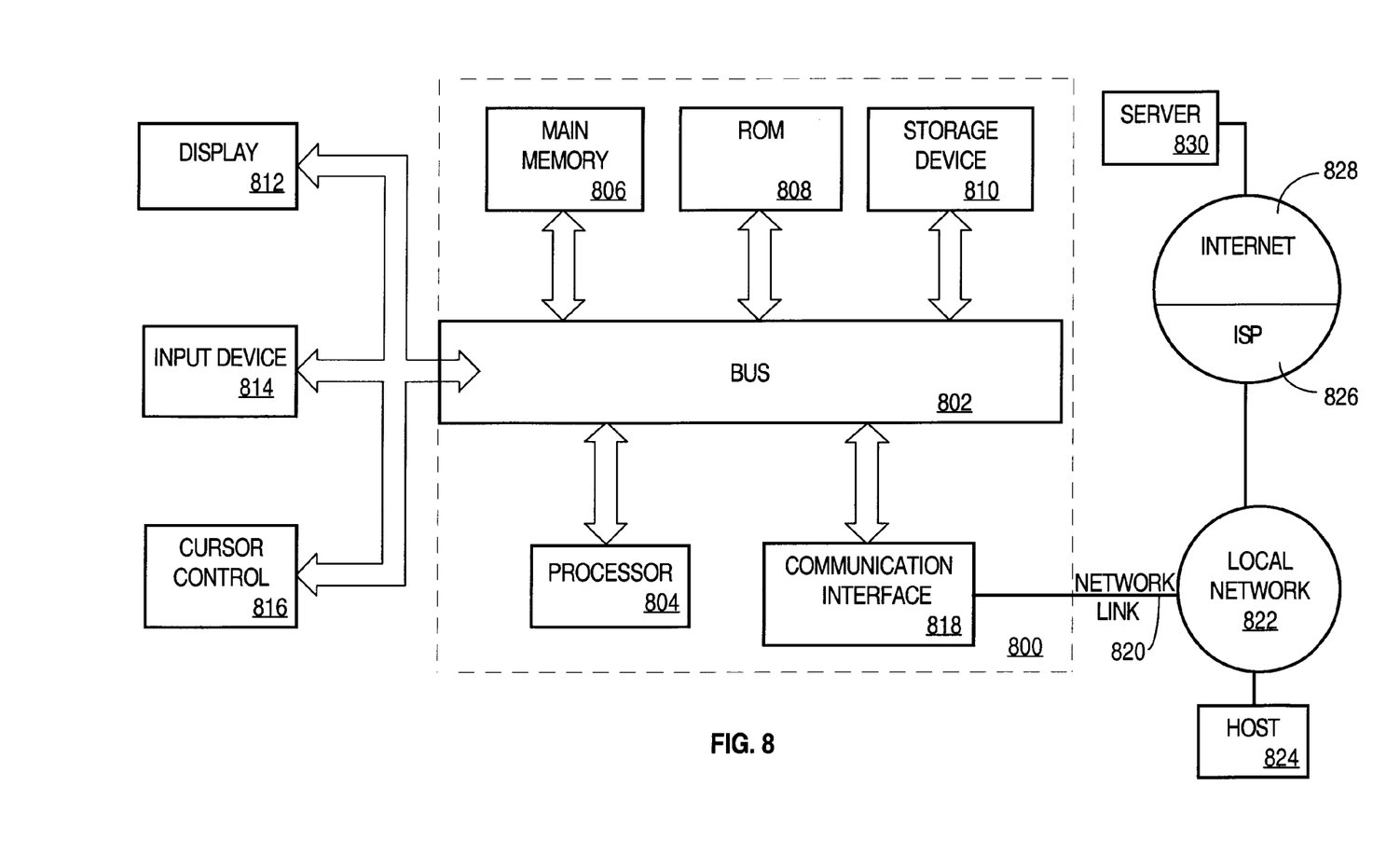
FIG. 8 is a block diagram depicting a computer system upon which an embodiment of the present invention may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for transforming queries. According to one embodiment of the invention, transforming queries is provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for transforming queries as described herein.

The received code may be executed by processor 804 as it is received, and/or stored in storage device 810, or other non-volatile storage for later execution. In this manner, computer system 800 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of transforming a first query, the method comprising the steps of:
   receiving said first query, wherein said first query specifies a first semijoin between a first table and a second table;
   determining whether a common section is shared between a view and said first query, wherein a view definition for said view includes a join between said common section and a materialized view delta, said common section including said first semijoin;
   determining whether said join between said common section and said materialized view delta is lossless with respect to said common section; and
   if said join between said common section and said materialized view delta is lossless with respect to said common section, then transforming said first query into a second query that accesses data through said view, said second query returning the set of data specified by said first query.

2. The method of claim 1, wherein said view is a materialized view and the step of transforming said first query includes transforming said first query into a second query that references said materialized view.

3. The method of claim 1, wherein the step of determining whether a common section is shared includes determining whether said common section is shared with a view definition that specifies a join of three or more tables that include said first table and said second table.

4. The method of claim 1, wherein the step of receiving said first query includes receiving a query that defines a first semijoin operation using an IN operator that operates upon a query block of said second table.

5. The method of claim 1, wherein the step of receiving said first query includes receiving a query that defines a first semijoin operation using an EXISTS operator that operates upon a query block of said second table.

6. The method of claim 1, wherein rows presented from said view each correspond to one row from said first table, and the step of transforming said first query into a second query further includes the steps of:
   determining whether said view definition references one or more distinguishing columns, that for each of said rows presented by said view, uniquely identify the one row from said first table that corresponds to said row presented by said view; and
   if said view definition references one or more distinguishing columns, then rewriting said first query to include a sub-query that accesses data through said view, said sub-query including a DISTINCT operator that operates upon a list of columns that include said one or more identifying columns.

7. The method of claim 6, wherein the step of determining whether said view references one or more distinguishing columns further includes determining whether said view references a row-id column, wherein:
   said row-id column corresponds to row-ids that are each associated with a row from said first table; and
   each row-id associated with a row from said first table uniquely identifies the row from said first table relative to all rows of said first table.

8. The method of claim 6, wherein the step of determining whether said view references one or more distinguishing columns includes determining whether said view references a column that corresponds to a unique key column of said first table.

9. The method of claim 1, wherein the step of determining whether said join between said common section and said materialized view delta is lossless includes determining whether said view definition defines an outer join between a third table and said second table.

10. The method of claim 1, wherein the step of determining whether said join between said common section and said materialized view delta is lossless includes determining whether said view definition defines a join between said second table and a third table, said second table being referentially constrained to said third table.

11. The method of claim 1, wherein:
    the step of receiving a first query includes receiving a first query that specifies a first semijoin and a second semijoin; and
    the step of whether said common section that includes said first and second semijoins is shared between said view and said first query.

12. The method of claim 11, wherein the step of transforming said first query includes transforming said first query into a second query that includes an antijoin filter that filters antijoin rows from said view.

13. A computer-readable medium carrying one or more sequences of one or more instructions for transforming a first query, wherein the execution of the one or more sequences of the one or more instructions by one or more processors, causes the one or more processors to perform the steps of:
    receiving said first query, wherein said first query specifies a first semijoin between a first table and a second table;
    determining whether a common section is shared between a view and said first query, wherein a view definition for said view includes a join between said common section and a materialized view delta, said common section including said first semijoin;

determining whether said join between said common section and said materialized view delta is lossless with respect to said common section; and if said join between said common section and said materialized view delta is lossless with respect to said common section, then transforming said first query into a second query that accesses data through said view, said second query returning the set of data specified by said first query.

14. The computer-readable medium of claim 13, wherein said view is a materialized view and the step of transforming said first query includes transforming said first query into a second query that references said materialized view.

15. The computer-readable medium of claim 13 wherein the step of determining whether a common section is shared includes determining whether said common section is shared with a view definition that specifies a join of three or more tables that include said first table and said second table.

16. The computer-readable medium of claim 13 wherein the step of receiving said first query includes receiving a query that defines a first semijoin operation using an IN operator that operates upon a query block of said second table.

17. The computer-readable medium of claim 13 wherein the step of receiving said first query includes receiving a query that defines a first semijoin operation using an EXISTS operator that operates upon a query block of said second table.

18. The computer-readable medium of claim 13 wherein rows presented from said view each correspond to one row from said first table, and the step of transforming said first query into a second query further includes the steps of:

determining whether said view definition references one or more distinguishing columns, that for each of said rows presented by said view, uniquely identify the one row from said first table that corresponds to said row presented by said view; and if said view definition references one or more distinguishing columns, then rewriting said first query to include a sub-query that accesses data through said view, said sub-query including a DISTINCT operator that operates upon a list of columns that include said one or more identifying columns.

19. The computer-readable medium of claim 18, wherein the step of determining whether said view references one or more distinguishing columns further includes determining whether said view references a row-id column, wherein:

said row-id column corresponds to row-ids that are each associated with a row from said first table; and each row-id associated with a row from said first table uniquely identifies the row from said first table relative to all rows of said first table.

20. The computer-readable medium of claim 18, wherein the step of determining whether said view references one or more distinguishing columns includes determining whether said view references a column that corresponds to a unique key column of said first table.

21. The computer-readable medium of claim 13, wherein:

the step of receiving a first query includes receiving a first query that specifies a first semijoin and a second semijoin; and the step of determining whether a common section is shared includes determining whether said common section that includes said first and second semijoins is shared between said view and said first query.

22. The computer-readable medium of claim 21, wherein the step of transforming said first query includes transforming said first query into a second query that includes an antijoin filter that filters antijoin rows from said view.

23. The computer-readable medium of claim 13, wherein the step of determining whether said join between said common section and said materialized view delta is lossless includes determining whether said view definition defines an outer join between a third table and said second table.

24. The computer-readable medium of claim 13, wherein the step of determining whether said join between said common section and said materialized view delta is lossless includes determining whether said view definition defines a join between said second table and a third table, said second table being referentially constrained to said third table.

* * * * *

UNITED STATES PATENT AND TRADEMARK OFFICE
CERTIFICATE OF CORRECTION

| | |
|---|---|
| PATENT NO. | : 6,449,609 B1 |
| DATED | : September 10, 2002 |
| INVENTOR(S) | : Andrew Witkowski |

It is certified that error appears in the above-identified patent and that said Letters Patent is hereby corrected as shown below:

<u>Title page,</u>
Item [54], please replace the title with -- USING A MATERIALIZED VIEW TO PROCESS A RELATED QUERY CONTAINING A SEMIJOIN --.

<u>Column 14,</u>
Line 47, after "the step pf", insert -- determining whether a common section is shared includes determining --.

Signed and Sealed this

Seventh Day of January, 2003

JAMES E. ROGAN
*Director of the United States Patent and Trademark Office*